Dec. 10, 1963   M. RIVIERE   3,113,507
FEED SYSTEMS FOR SUGAR CANE MILLS
Filed Nov. 10, 1960   5 Sheets-Sheet 1
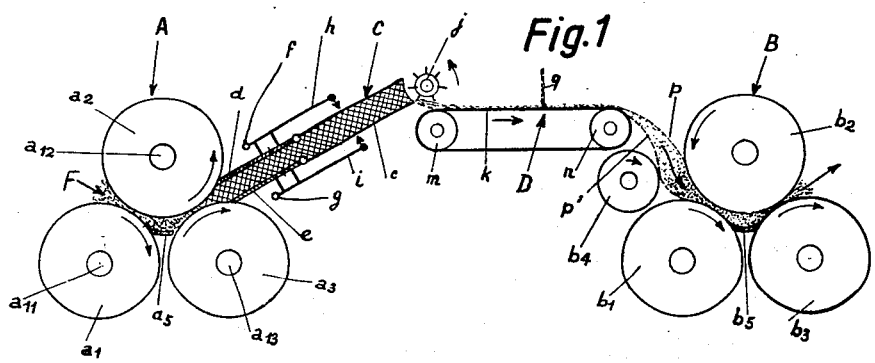
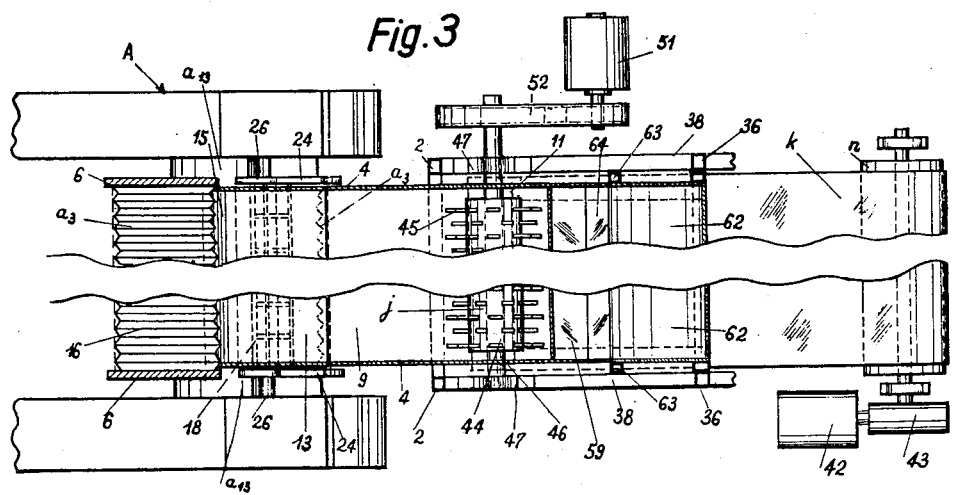
INVENTOR
MAXIME RIVIERE
By Irwin J. Thompson
ATTY.

INVENTOR
MAXIME RIVIERE
BY Irwin S. Thompson
ATTY.

Dec. 10, 1963  M. RIVIERE  3,113,507
FEED SYSTEMS FOR SUGAR CANE MILLS
Filed Nov. 10, 1960  5 Sheets-Sheet 3

INVENTOR
MAXIME RIVIERE
BY Irwin S. Thompson
ATTY.

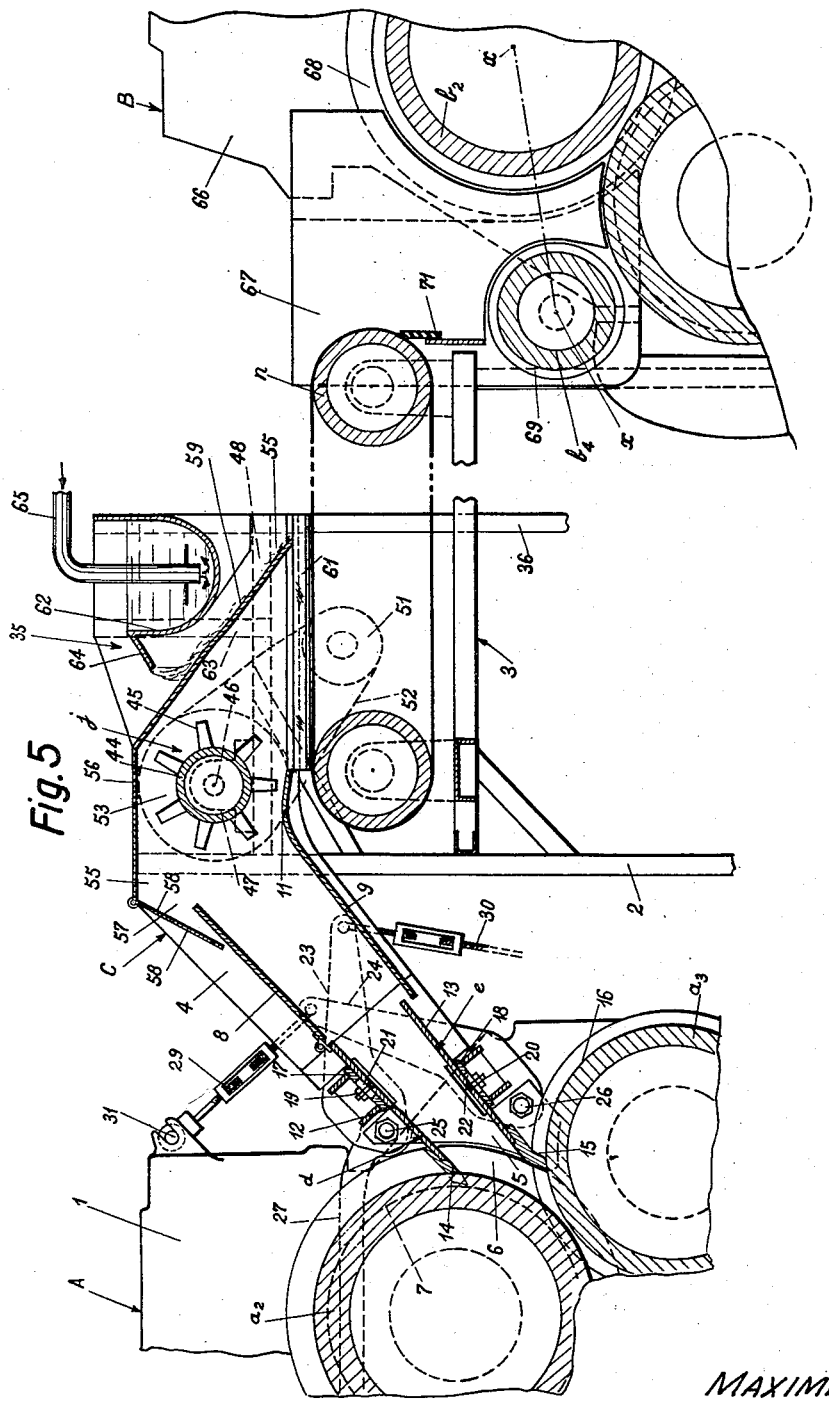

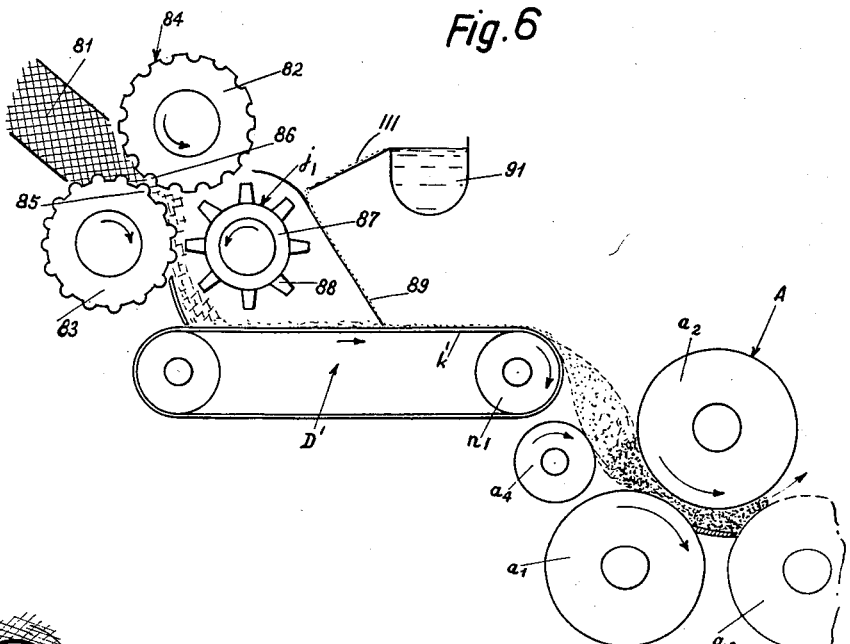
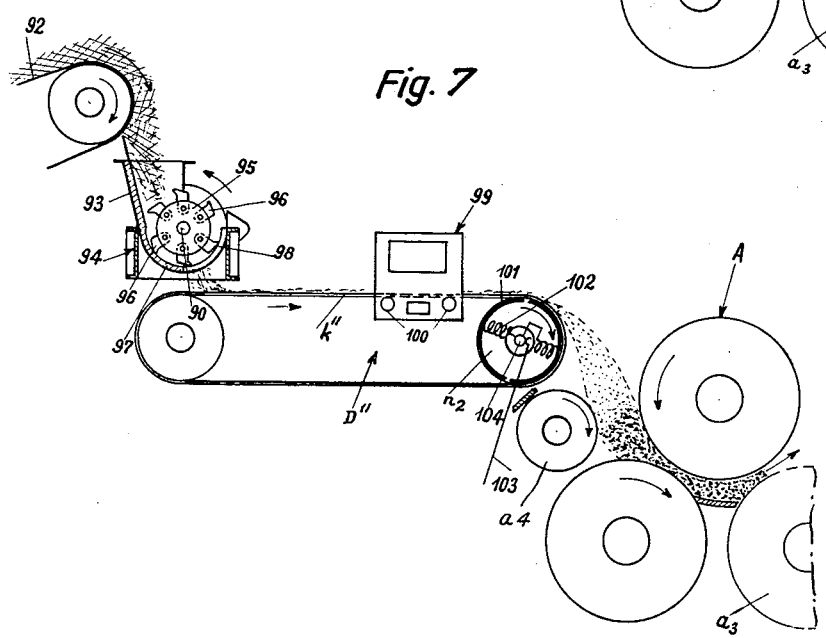

United States Patent Office 3,113,507
Patented Dec. 10, 1963

3,113,507
FEED SYSTEMS FOR SUGAR CANE MILLS
Maxime Riviere, Cambuston, Ile de la Reunion
Filed Nov. 10, 1960, Ser. No. 68,452
Claims priority, application France Mar. 23, 1960
3 Claims. (Cl. 100—75)

The present invention relates to improvements in or relating to the feed systems of mills used for crushing sugar cane so as to extract the sugar juice contained therein.

More precisely, it is known that the mechanical treatments of sugar cane heretofore applied in sugar mills include a cane preparing stage intended to transform said cane into a pulp called bagasse and a stage for effecting the extraction of the sugar juice contained in said bagasse.

The conventional apparatus used for the preparation of sugar cane are the cane-cutter, the crusher and the shredder.

The cane squeezing apparatus consist of mills usually including three grooved rollers. A sugar cane mill may thus comprise a line of four to ten mills, each including three rollers, wherein the bagasse is conveyed successively.

Arranged between these various machines are devices for carrying the bagasse. Thus, a carrier has to be provided between the cane-cutter and the crusher or between the crusher and the first mill, and other carriers between the various mills. If a shredder is interposed between a crusher and the first mill, then carriers to and from this apparatus shall also be provided.

Various types of such carriers have been designed, such: as chutes, endless belts driven by power rollers, chains provided with rakes carrying along the bagasse generally called drag type, conveyor carrier-chains consisting of grating mounted on a continuous runway and receiving the bagasse (generally called apron or slat carriers).

Purely static carriers, called Meinecke carriers, are also known, these being more particularly intended for interconnecting the various mills in a crushing line. These carriers are also called "intermediate carriers" in the art.

In these devices, the bagasse issuing from the upstream mill is pushed onto an upwardly inclined surface which is followed by a downwardly directed chute leading to the next downstream mill. The bagasse is caused to progress on the upwardly inclined surface due to the thrust exerted by the rollers of the upstream mill which delivers the bagasse. When reaching the top of the inclined surface, the compact bagasse bed slides in a still compact condition along the chute to reach the two feeding rollers of the downstream mill. Such an arrangement is more advantageous than the apron type or drag type carriers which are fragile, costly and have a high power consumption.

However, the use of the stationary Meinecke carriers is attended by two serious drawbacks, viz: the taking up of the bagasse by the downstream mill is uneasy. On the other hand, said device does not allow for bagasse imbibition. Now, it is known that imbibition is a technique whereby a substantial percentage of the bagasse sugar juice, which otherwise would be lost, may be recovered.

With a view to obviate these drawbacks, provision was made in the mills of devices called "feeders" which force the bagasse between two adjacent mill rollers. Thus rotary feeders exist which consist of rollers provided with longitudinal grooves and located above or beneath the bagasse bed, adjacent the chute of the Meinecke carrier.

Reciprocating feeders are also known, wherein pistons apply a pressure to the bagasse bed at its point of insertion between the two mill rollers. However, the improvement afforded by such devices in the mill capacity is rather poor (10 to 20%, for example). On the other hand, since the taking up of bagasse by the mills is impaired by imbibition, the common trend is to reduce the rate of imbibition so as to prevent choking.

Such practice results in a noticeable reduction in the percentage of bagasse extraction, which is very prejudicial.

The present invention, the purpose of which is to remedy the above-mentioned drawbacks, relates to a device for dynamic feeding of the mills or shredders or, more generally, of the crushing or extracting apparatus for the bagasse, comprising at least two co-axial rollers between which the bagasse bed is fed.

More precisely, one of the objects of the invention is to improve the capacity of the mills and other roller apparatus of the aforesaid type. Another object of the invention is to improve the percentage of cane juice extraction.

Alternatively, another object of the invention is also to reduce the percentage of bagasse imbibition while maintaining the percentage of extraction.

The invention is directed to the provision of feed devices for mills and the like, said devices being of reduced initial cost, very simple to operate and to maintain and requiring but a low supply of power.

A further object of the invention also is to allow for a reduction in the mill operating speed and therefore in the corresponding power consumption, while maintaining the daily output.

According to the invention, feeding the mills in cane sugar industry is mainly characterized in that the broken up cane (or bagasse) is fed to an endless rubber belt carrier driven at a high horizontal speed, substantially higher than the cane feed speed, so as to create on the carrier belt a thin bagasse layer having an appreciable kinetic energy. Said invention consisting, at the outlet of the carrier, in dynamically propelling the bagasse into the opening of the mill rollers to be fed, which are rotated at a peripheral speed substantially lower than that of the carrier, so as to cause at the inlet of said mill the restoration of a thick bagasse bed and a self-ramming action thereof which facilitates its insertion between the mill rollers.

In a preferred embodiment of the above process, suitable notably for feeding the various mills in a crushing line, the bagasse is subjected to an imbibition step while extending in a thin layer on the high-speed carrier. Imbibition may thus be achieved with a maximum efficiency and with a minimum amount of water.

The invention further provides a device for the dynamic feeding of sugar cane mills. Said device comprises in combination a system for feeding the cane at low speed and in a thick bed, followed by a delivery system comprising a clawed rotary member adapted to break up the thick bagasse bed and project it into an endless belt carrier driven at high speed and leading close to and above the apparatus to be fed so as to allow for projection into said apparatus of the bagasse conveyed by said carrier.

In a preferred arrangement of the above device, intended to provide an intermediate carrier for the bagasse between two successive mills in a crushing line, the device comprises an upwardly inclined trough arranged at the outlet of the upstream mill and allowing the bagasse to ascend in a thick bed, a rotary delivery device located at the outlet of the aforesaid trough and adapted to break up the bagasse bed and project it into a thin layer onto the endless belt carrier.

Other particular features of the invention will result from the following description taken in conjunction with the accompanying drawings, which are given by way of non-restrictive examples:

FIG. 1 is a diagrammatic elevational side view illustrating the invention as applied to the feeding of the mills in a battery of such mills.

FIG. 3 is a plane sectional view taken along III—III of FIG. 2.

FIG. 5 is, on a larger scale, an elevational sectional view taken along the center line and with parts broken away, of the feed device of FIG. 2.

FIG. 6 is a diagrammatic elevational view showing the application of the invention to the feeding of a mill located downstream of a crusher.

FIG. 7 is another diagrammatic view relating to the application of the invention to the feeding of a mill located downstream of a hammer shredder.

Figure 2:
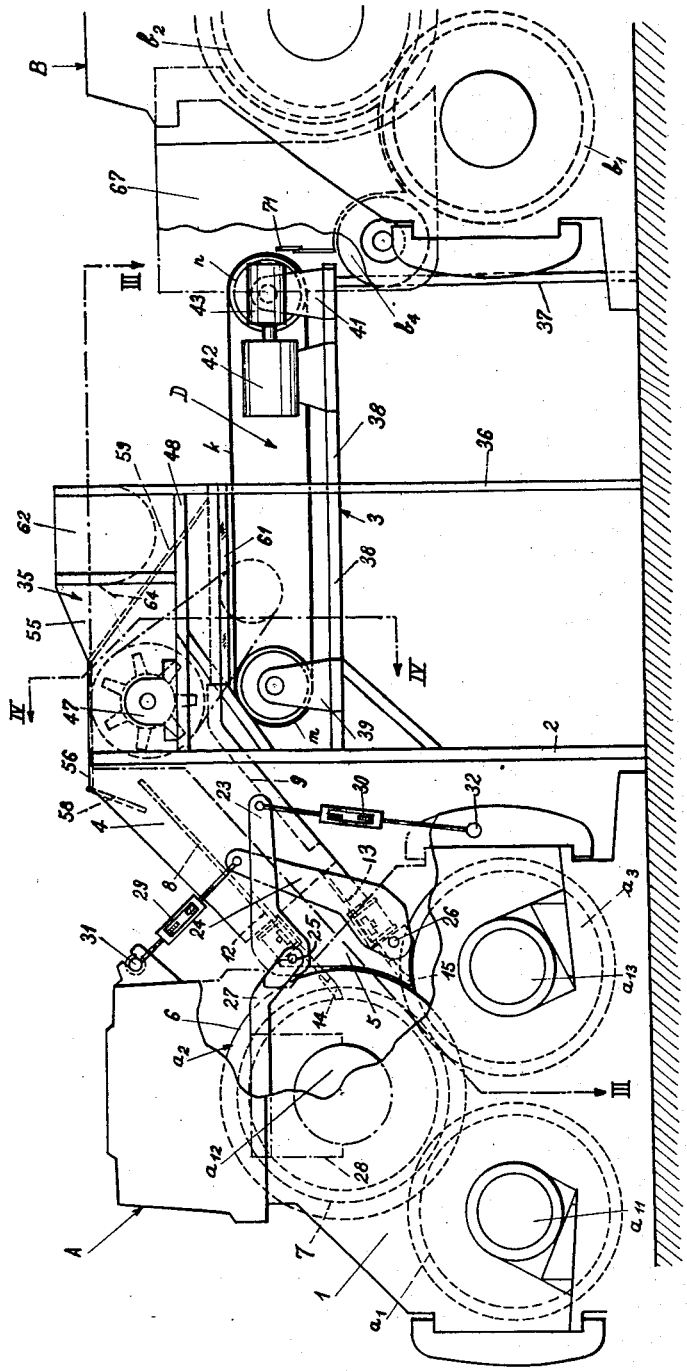
FIG. 2 is a more detailed elevational side view, with parts broken away, of two mills provided with a feed device according to the invention.

The process according to the invention will be set forth hereunder with reference to an installation which will be diagrammatically described, an example of industrial adaptation thereof being given hereinafter.

More precisely, FIG. 1 relates to the main application of the process according to the invention to the feeding of the successive mills in a mill battery of conventional type. The reference A designates the upstream mill, comprising three rollers $a_1$, $a_2$, $a_3$, whereof the axes $a_{11}$, $a_{12}$, $a_{13}$ are parallel and passing through the apices of an isosceles triangle. Similarly, the reference B designates the downstream mill also comprising three rollers $b_1$, $b_2$, $b_3$ having their axes arranged similarly to those of mill A. The bagasse is fed at $f$ between the rollers $a_1$, $a_2$ and is conveyed by a member $a_5$ called a trash or turner plate to the opening of rollers $a_2$, $a_3$.

In practise, the mill roller speeds may range from 1.9 to 4.5 r.p.m., the roller diameters usually ranging from 600 to 1,000 millimeters.

Mills A and B may have any rank in the mill line provided for squeezing the bagasse.

After being crushed between the rollers $a_1$, $a_2$, then $a_2$, $a_3$, the bagasse is delivered to a stationary intermediate carrier C which may be compared to the upward portion of the Meinecke carrier and which comprises a fixed trough $c$ which is provided at its end adjacent the rollers $a_2$, $a_3$ with extensions in the form of flaps $d$, $e$ pivoted at fixed points $f$ and $g$ and responsive to control arms $h$, $i$. These arms are adapted to apply the flaps $d$ and $e$ onto the rollers $a_2$, $a_3$, to take up the play resulting from the wear of the spout at each flap end as well as to adjust the interflap spacing.

According to the present invention, there is provided at the outlet of trough $c$ a high-speed delivery device $j$, consisting for example of a clawed roller applying a downwardly directed raking action at the outlet of trough $c$. Arranged beyond the delivery device $j$ is a carrier D comprising an endless belt $k$ horizontally mounted on two driving rollers $m$, $n$.

The roller $n$ is located substantially above a feed roller $b_4$ provided for mill B. The exact positioning of roller $n$ with respect to the rollers $b_1$, $b_2$ and $b_4$ is determined as a function of the dynamic operating conditions, as will be presently described.

The procedure provided by the invention is as follows: the bagasse fed to mill A, after being crushed between rollers $a_1$, $a_2$, then $a_2$, $a_3$, is introduced between flaps $d$, $e$ directing it to trough $c$, wherein it is self-raised under the thrust resulting from the continuous bagasse output from between rollers $a_2$, $a_3$. The bagasse ascending speed depends notably upon the output of mill A. It may range, on an average, between 8 and 12 meters per minute and corresponds to the peripheral speed of rollers $a$.

When the compact bagasse bed reaches the outlet of trough $c$, it is subjected to the action of the delivery device $j$, rotating at high speed, e.g. 300 r.p.m.

On the other hand, carrier D is in turn driven at a high linear speed of the order of 100 meters per minute, and therefore substantially equal to ten times the peripheral speed of rollers $a_1$, $a_2$, $a_3$. Under these conditions, the thick (several tens of centimeters) and compact bagasse bed reaching the outlet of trough $c$ is broken up by the delivery device claws, moving along a transverse direction. Under this very strong dynamic action, the bagasse is projected at high speed onto the belt $k$ of carrier D. As a result of these sequential operations, the low-speed, thick bagasse bed in carrier C is transformed into a high-speed, thin (a few centimeters) layers, the dynamic characteristics being such that the outputs are equal.

When the bagasse in thin layer form reaches the downstream roller $n$ of carrier D, under the effect of its kinetic energy, it is dynamically propelled in a substantially parabolic layer into the hopper formed by rollers $b_1$, $b_2$, $b_4$. The adjustment of the system is such that the upper layer surface $p$ is substantially tangential to roller $b_2$ while the lower layer surface $p'$ is substantially tangential to the feed roller $b_4$ when the system is adjusted in the manner set forth, it will be said hereinafter that the endless belt conveyor is in a "dynamically propelled delivering relationship" with the associated mill. Under such conditions, the cane particles, being propelled with appreciable kinetic energy, are subjected to a ramming action at the inlet of the downstream mill B and are thus forcefully introduced into the opening of rollers $b_1$, $b_2$. Dynamic feeding of mill B is thus effected while preventing any risk of choking up.

It is clear that the adjustment of devices D and B in a dynamically propelled delivering relationship wherein the bagasse particles are dynamically propelled into the inlet opening of mill B is operative only if the conveyor D is driven at the high speed, as above set forth, as regards the peripheral velocity of the mill rollers, because in the contrary case, the bagasse carried along by the belt $k$ would be dropped and not dynamically propelled and would fall out of the mill inlet.

The feed roller $b_4$ is located as close as possible to the roller $b_1$ and it serves to cause some squeezing of the bagasse layer which is thus re-converted into a thick bed before being passed through the rollers $b_1$, $b_2$ and $b_2$, $b_3$.

In a preferred embodiment of the above process, provision is made for applying an imbibition step to the bagasse while extending in thin layer on the carrier D. For this purpose, there is provided between the delivery device $j$ and the roller $n$ a transverse sheet $q$ of water (or of the desired imbibition liquid). The amount of water is about 20 liters per 100 kilos of cane. Since the bagasse is arranged in a thin layer thorough imbibition is thus achieved.

The technical advantages afforded by the process according to the invention are as follows:

The mill production capacity is increased by about 20%.

The sugar juice extraction percentage is raised from the 95% at present obtained in the known installations to 97%, while the bagasse imbibition percentage is lowered from 30–40% to 20%. This twofold improvement results in the additional recovery of, on an average, 2 kilos sugar per metric ton of cane. Moreover, in view of the reduction in the amount of water, the heat required for evaporating the sugar juices is in turn reduced, thereby lowering the sugar cost price.

As a subsidiary result, the initial cost of the installation may be lowered by fifty percent as compared with the known plant, since the equipment involved is much more simple and light.

The system cleanliness is improved and the maintenance cost is reduced. On the other hand, the power consumption of carrier D is about 10 times lower than that of the conventional chain conveyors.

Figure 4:
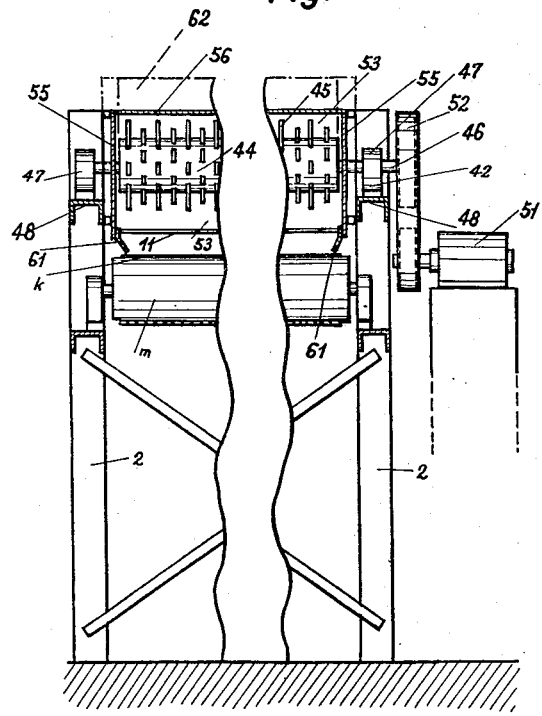
FIG. 4 is an elevational sectional view taken along IV—IV of FIG. 2.

An installation for carrying on the above process will now be described with more details with reference to FIGS. 2 to 4 where the parts shown in FIG. 1 will be designated by the same references, the drive means for the mill rollers being omitted for clarity's sake (these means usually consist of a prime mover such as a steam turbine and a gear train for connecting same to the crushing rollers. The feed rollers are driven through a gear and chain arrangement from one mill roller).

In this embodiment, the trough of the bagasse carrier C is mounted between the stand 1 of mill A and the uprights 2 of a metal frame structure 3 supporting the carrier D.

This carrier comprises two vertical metal sheet walls 4 having their upstream ends 5 engaging the cheeks 6 of roller $a_2$, the latter having its peripheral face formed with a series of adjacent transverse grooves 7, like the other mill rollers.

The walls 4 of trough c are united together, in the second half portion of the carrier, by two fixed, slightly diverging walls 8, 9, and wall 9 being formed with a horizontal extension 11.

The angularly adjustable flaps $d$ and $e$ consist of plates 12, 13 terminating in indented wear spouts 14, 15, fitting into the grooves 7 and 16 in rollers $a_2$, $a_3$.

The plates 12, 13 are separately mounted on transverse shaped sections 17, 18 by means of bolts 19, 20 extending through slots 21, 22 to allow for taking up of any undesired play.

The shaped sections 17, 18 are in turn carried by levers 23, 24 pivoted on pivot pins 25, 26. The former is mounted on a bracket 27 rigid with bearing 28 of trunnion $a_{12}$, while the latter is pivoted on the stand 1.

The levers 23, 24 are connected to the stand through take-up tighteners 29 and 30, respectively secured at 31, 32 to fittings of stand 1.

The frame structure 3 supporting the carrier D is also adapted for receiving, in a manner to be set forth, the delivery device $j$ and the imbibition device 35 for the bagasse in thin layer form.

The successive uprights 2, 36, 37 are interconnected by longitudinal bars 38 supporting the bearings 39, 41 of the rollers $m$ and $n$ of carrier D, said drums in turn receiving the endless belt $k$, e.g. of flexible rubber. Said belt is driven by a motor 42 provided with a reducing gear 43.

The belt $k$ is located beneath the extension 11 of wall 9. Mounted above said extension is the delivery device $j$ comprising a roller 44 provided with thin radial fins 45. The trunnions 46 of roller 44 are carried by bearings 47, in turn mounted on longitudinal bars 48 interconnecting the uprights 2 and 36.

Roller 44 is driven by a motor 51 through a transmission 52.

The delivery device $j$ is housed in a chamber 53, closed laterally by panels 55 aligned with walls 4, and at the top by a plate 56 forming with wall 8 a communication aperture 57, closed by a pivoted flap 58. Plate 56 has an extension formed by an inclined metal sheet plate 59, so that beyond and downstream of the extension 11, chamber 53 is open above belt $k$. Lateral inclined baffles 61 provide a connection between the panels 55 and the belt $k$.

The imbibition system 35 comprises essentially a transverse U-shaped tank 62 which is mounted on posts 63 and provided with a spout 64 extending above the inclined plate 59.

Tank 62 is supplied with water through a central duct 65.

The downstream end of carrier D is connected to the upper parts of the frame structure 66 of mill B. More precisely, roller $n$ is provided on both sides with a pair of side-plates 67 projecting between the cheeks 68 of roller $b_2$. The side-plates 67 carry the bearings of the feed roller $b_4$ which is also formed with grooves 69. Arranged between the roller $n$ and the roller $b_4$ is a flexible scraper 71.

During operation, the plates 12, 13 serve to guide the bagasse towards the walls 8 and 9 of carrier C. The tighteners 29 and 30, while maintaining the desired spacing between plates 12 and 13, ensure the require bagasee compression.

The upper portion of the bagasse bed is scraped off by the fins 45 and the bagasse particles are scattered evenly over the extension 11 and onto belt $k$. Baffles 61 and inclined plate 59 ensure suitable deflection of the shredded bagasse towards belt $k$.

The inclined plate 59 also serves to guide the water which forms a transverse sheet at its lower end.

The thus soaked bagasse is then propelled between the rollers $b_1$, $b_2$, $b_3$ in a parabolic layer, as has been described above. The thick bagasse bed is thus restored beneath line $x$—$x$ drawn between the centers of rollers $b_2$, $b_4$ the space left between said rollers corresponding to the inlet opening of the mill.

The embodiment shown in FIG. 6 is a first application of the invention to the leading mill A of a mill train.

The bagasse, which has been cut into lengths by a canecutter (not shown) is fed by a chute 81 to the opening of the two rollers 82, 83 of a crusher 84. The rollers 82, 83 of this apparatus, which is known per se, rotate in opposite directions and their surface is formed with projections (such as 85) registering with recesses (such as 86).

At the outlet of the crusher 84 is arranged the delivery device $j_1$ which may be adapted advantageously not only for effecting projection of the bagasse at high speed, but also for completing its shredding. For this purpose, use may be made of an apparatus 87 of the Maxwell shredder type, with teeth 88 of stronger structure than those of the delivery device $j$ of the preceding embodiment.

The delivery device $j_1$ is located above the high-speed belt carrier D', over which extends an inclined plate 89 supplied with water by an overflow tank 91. The edge of tank 91 is provided with an overflow plate 111 stretching down to the vicinity of the plate 89. It is clear that the overflowing imbibition liquid glides on plate 111, therefrom on plate 89 and creates at the lower end thereof a liquid sheet flowing transversally to the belt $k'$ whereby an initial imbibition of the bagasse can be effected prior to crushing. The rotary roller $n_1$ fitted at the downstream end of the carrier D' is located close to the inlet of mill A which is provided in this example with a feed roller $a_4$.

The operation is similar to that which has already been described. The delivery device $j_1$, which in this case also assists in breaking the bagasse into pieces, projects the latter in a thin layer onto the belt $k'$ whereby it is carried at high speed and, once soaked, propelled with substantial kinetic energy into the opening of rollers $a_2$, $a_4$. The bagasse is then compacted in the area formed by the rollers $a_1$, $a_2$, $a_4$.

In this embodiment, the cane is finely prepared before being squeezed in the mills and the required number of mills may therefore be reduced.

FIG. 7 shows another application of the invention to the dynamic feeding of the leading mill A of a mill train.

The cane, after being cut into lengths by a cane-cutter not shown, is fed by a belt carrier 92 into the hopper 93 of a hammer shredder 94 comprising a series of juxtaposed and coaxial discs 95, each of which is provided with a succession of hammers 96. Only one of these discs 95 may be shown on the transversal section of FIG. 7. The discs 95 which are all mounted on the same rotary shaft 90, rotate in unison in a trough 97 formed with an opening 98 overlying the belt $k''$ of the high speed carrier D''.

The belt $k''$ passes through an integrating balance 99 of known type adapted to calculate the total weight of bagasse carried as the latter travels past the sensing rollers 100 of the weighing device.

The downstream roller $n_2$ used for the return of the belt at the downstream end of the carrier D'' is in this case designed for effecting a magnetic sorting in the bagasse. This drum is provided for this purpose with peripheral pole-pieces 101 connected to the cores of electromagnets 102, fed with current through conductors 103 by means of a brush and slip ring system 104.

In this installation, as the pulverized bagasse is thrown onto belt k'' by shredder 94, it is automatically weighed by the balance 99. If a magnetic scrap is present within the bagasse layer carried by the belt k'', this scrip is attracted by one of the pole-pieces 101 and remains fixed on the belt surface, whereas the bagasse layer is projected due to the high speed of the belt, to the inlet of mill A. The iron scrap is carried away with the belt until the pole-piece 101 leaves the belt. At this time the scrap has been carried further than the feeding roller $a_4$.

It is clear that since the bagasse layer is thin, the magnetic separation of iron scraps as effected by roller $n_2$ is particularly efficient. The feeding of mill A is of dynamic character, as in the preceding example.

Obviously, the invention is not limited to the embodiments described above, as many changes may be brought thereto. Thus, the belt carrier for the bagasse in thin layer can also be used for feeding a crusher, such as mill 84 in FIG. 6.

What is claimed is:

1. In a cane sugar roller mill having an inlet opening and three crushing rollers including an upper one and two lower ones, means for rotating said rollers at a definite peripheral velocity, a feeding device for said roller mill, said device comprising means to deliver a thick bagasse bed at a speed substantially corresponding to said rollers' peripheral velocity, means disposed adjacent to said delivering means to break said thick bagasse bed into bagasse particles, said breaking means comprising a clawed rotary member driven at a high velocity in engaging relationship with respect to said bagasse bed to project the bagasse particles forwardly therefrom, means moving substantially in the same direction as said bagasse particles to collect the same and carry them towards said roller mill, said moving and carrying means comprising an endless rubber-like belt movably mounted on an upstream roller and a downstream roller, means to drive said moving and carrying means at a longitudinal speed of about ten times the delivering speed, said bagasse particles thereby forming on said belt a thin layer not exceeding a few centimeters of thickness, imbibition means disposed above said endless belt to apply a liquid onto said thin layer of bagasse particles, said moving and carrying means dynamically propelling the imbibed bagasse particles into the roller mill inlet opening, and means disposed between said downstream roller and said inlet opening of the mill to feed the dynamically propelled bagasse particles into the inlet opening.

2. In a line of two sugar cane roller mills each having inlet and outlet openings provided between rollers rotating at a definite peripheral velocity, a device for the dynamic feeding of the second one of said mills with the bagasse particles delivered by the first one after deposit thereon of imbibition liquid, said device comprising an upwardly inclined trough having a lower inlet and an upper outlet, said lower inlet being arranged at the outlet of said first mill to receive the bagasse therefrom to form a bagasse bed within the trough, a rotary clawed member provided at said upper outlet of said trough, means to drive said clawed member at a high peripheral velocity several times higher than the velocities of said mill rollers to break said bagasse bed into bagasse particles and project same forwardly therefrom, an endless belt carrier directed towards said second roller mill and disposed under said rotary member in a direction substantially transverse thereto, said carrier comprising a rubber-like endless belt movably mounted on an upstream roller and a downstream roller, means for driving said belt at a longitudinal speed about ten times higher than the peripheral velocity of said mill rollers, means for guiding the bagasse particles broken and projected by said clawed rotary member onto said endless belt, the bagasse particles projected onto said belt thus forming a substantially uniform and thin layer not exceeding a few centimeters of thickness, means fitted above said belt carrier and downstream relative to said rotary member for delivering onto the thin layer of bagasse particles on said belt imbibition liquid as a sheet substantially perpendicular thereto, the downstream roller of said belt carrier being located substantially in front of and above said second mill inlet opening, said thin layer of bagasse particles being dynamically propelled into said inlet opening by said carrier.

3. In a line of two sugar cane roller mills each having inlet and outlet openings provided between crushing rollers rotating at a definite peripheral velocity, a device for the dynamic feeding of the second one of said mills with the bagasse particles delivered by the first one after deposit thereon of imbibition liquid, said dynamic feeding consisting of propelling with a substantial kinetic energy bagasse particles into parabolic trajectories into said second mill inlet opening, said device comprising an upwardly inclined trough having a lower inlet and an upper outlet, said lower inlet being arranged at the outlet of said first mill to receive the bagasse therefrom to form a bagasse bed within the trough, an endless belt carrier directed towards said second roller mill, said carrier comprising a horizontal rubber-like endless belt movably mounted on an upstream roller located beneath said trough upper outlet and a downstream roller in front of and above said second mill inlet opening, means to drive the endless belt carrier at a speed about ten times that of the peripheral velocity of the mill rollers, a rotary clawed member disposed at said trough upper outlet immediately above said endless belt and in a direction substantially transverse thereto, means to drive said clawed rotary member at a high peripheral velocity several times higher than the velocity of said mill rollers to break the bagasse bed into bagasse particles and project same forwardly therefrom, the peripheral velocity of said clawed member at the part thereof close to said endless belt having the same feeding direction as this latter, means for guiding the bagasse particles broken and projected by said clawed rotary member onto said endless belt to form a thin layer of bagasse particles thereon, means fitted above said belt carrier for delivering onto the thin layer of bagasse particles on said belt imbibition liquid as a sheet substantially perpendicular thereto, said delivering means being located between said clawed rotary member and said belt carrier downstream roller, and means disposed between the downstream roller and the second mill inlet opening to feed the dynamically propelled bagasse particles from the endless belt carrier into the second mill inlet opening.

References Cited in the file of this patent

UNITED STATES PATENTS

| | | |
|---|---|---|
| 246,731 | Davis | Sept. 6, 1881 |
| 321,006 | Chapin | June 30, 1885 |
| 989,876 | Rosenow | Apr. 18, 1911 |
| 1,170,619 | Ewart | Feb. 8, 1916 |
| 1,346,594 | Deerr | July 13, 1920 |
| 1,353,349 | Krafft | Sept. 21, 1920 |
| 1,497,181 | Meinecke | June 10, 1924 |
| 1,670,097 | Bowden et al. | May 15, 1928 |
| 1,775,830 | Reynolds | Sept. 16, 1930 |
| 1,852,055 | Maxwell | Apr. 5, 1932 |
| 1,855,606 | Luce | Apr. 26, 1932 |
| 1,881,186 | Hegenbarth | Oct. 4, 1932 |
| 2,839,651 | Erickson | June 17, 1958 |